(12) United States Patent
Plasek

(10) Patent No.: US 6,389,367 B1
(45) Date of Patent: May 14, 2002

(54) METHOD AND APPARATUS FOR CALIBRATING READINGS OF A DOWNHOLE TOOL

(75) Inventor: Ronald E. Plasek, Houston, TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/504,528

(22) Filed: Feb. 15, 2000

Related U.S. Application Data (60) Provisional application No. 60/123,694, filed on Mar. 10, 1999.

(51) Int. Cl.$^7$ .............................................. G06F 19/00
(52) U.S. Cl. ..................................... 702/104; 250/269.6
(58) Field of Search ........................... 702/6, 7, 8, 104; 73/152.01, 152.14; 250/251.1, 269.6, 269.7, 261, 262, 264

(56) References Cited

U.S. PATENT DOCUMENTS

| | | |
|---|---|---|
| 3,521,064 A | 7/1970 | Moran et al. |
| 4,937,446 A | 6/1990 | McKeon et al. |
| 5,120,955 A * | 6/1992 | Galford ........................ 250/256 |
| 5,369,578 A | 11/1994 | Roscoe et al. |
| 5,461,230 A * | 10/1995 | Winemiller ................. 250/261 |
| 6,286,283 B1 * | 9/2001 | Plasek ............................ 702/8 |

FOREIGN PATENT DOCUMENTS

| | | |
|---|---|---|
| EP | 0 621 494 A1 | 10/1994 |
| GB | 2 288 017 | 10/1995 |

* cited by examiner

*Primary Examiner*—John S. Hilten
*Assistant Examiner*—Dinh Hang
(74) *Attorney, Agent, or Firm*—John J. Ryberg; Victor H. Segura (57) ABSTRACT

A method and apparatus for calibrating readings of a downhole tool are provided. The method including collecting data representative of gamma ray photon energies detected by a downhole tool during the well-logging, a spectrum of the gamma ray photon energies detected by the downhole tool having a derivative with respect to the gamma ray photon energies. The method and program comprise calibrating the readings of the downhole tool using at least one predetermined correction factor based on the derivative of the spectrum of the gamma ray photon energies detected by the downhole tool. A computer-readable program storage device and a computer programmed to perform a set of instructions are also provided.

21 Claims, 4 Drawing Sheets

METHOD AND APPARATUS FOR CALIBRATING READINGS OF A DOWNHOLE TOOL

CROSS-REFERENCES

This present application claims the benefit of U.S. Provisional Application No. 60/123,694 filed on Mar. 10, 1999.

BACKGROUND OF THE INVENTION

1. Field of the Invention

This invention relates generally to investigation of subsurface earth formations, and, more particularly, to a method for correcting data obtained by a downhole tool for anomalies that may be caused by environmental characteristics and/or intrinsic downhole tool parameters. The invention has general application in the well logging art, but is particularly useful at a well site while logging.

2. Description of Related Art

A major goal of well logging is to maximize the amount of hydrocarbons recovered from an earth formation. By continuously monitoring oil saturation in the earth formation, secondary and tertiary techniques may be employed to enhance recovery of hydrocarbons. Oil saturation is usually expressed as a percentage by volume of oil in the pore space. Different methods have been developed for monitoring oil saturation during production of a well.

One method for monitoring oil saturation is based on the fact that hydrocarbons contain carbon and water contains oxygen. A carbon/oxygen ratio ("COR") is used to compute oil saturation. The COR is derived by applying a spectral fitting technique to an inelastic gamma ray spectrum to compute carbon, oxygen, and other elements present in the formation. This approach provides one means for computing the COR.

Alternatively, the COR is derived using counts from broad energy regions "windows" in the inelastic gamma ray spectrum across the region of the predominant carbon and oxygen gamma ray energies. The COR is derived by taking the ratio of the counting-rates in two energy windows of the inelastic gamma ray spectrum. Such measurements will be referred to herein as "windows COR value" measurements. All gamma rays in these windows do not result solely from the elements carbon (C) and oxygen (O). Nevertheless, this count-rate windows COR value will respond to changes in oil saturation in the formation, provided the other formation and borehole properties remain constant.

The conversion between the spectrally fitted COR and the windows COR value and the oil-saturation value is typically determined by making many measurements with one downhole tool (called the "database" or "characterization" tool) at standard conditions in laboratory simulated formations having accurately known porosity, lithology, completion geometry, and saturation. This database set of measurements is commonly known as the "tool characterization." The tool characterization may also be derived by theoretical modeling techniques as known in the art.

Gamma ray photon energies are detected downhole with the use of conventional downhole tools such as the Reservoir Saturation Tool (RST), a mark of Schlumberger (see U.S. Pat. No. 4,937,446, assigned to the present assignee), or any similar tool. To provide the COR measurements, these tools are disposed downhole to irradiate the borehole and surrounding formation with high-energy neutrons. Detectors in conventional downhole tools typically use scintillation crystals, such as thallium-activated sodium iodide (NaI), thallium-activated or sodium-activated cesium iodide, bismuth germanate (BGO), gadolinium oxyorthosilicate doped with cerium (GSO), and the like. The gamma ray detector or detectors in the tool measure gamma ray photons produced from carbon (C) and oxygen (O) during the neutron burst as a result of neutron inelastic scattering from the nuclei of carbon (C) and oxygen (O) present in the formation and the borehole. Analyzing the inelastically produced gamma ray photon energy spectrum for the characteristic energy gamma ray photons from atomic elements such as carbon (C), oxygen (O), silicon (Si), calcium (Ca), iron (Fe), and the like, allows the presence of these elements, and their relative abundance, in the formation and borehole regions, to be quantified.

When the formation water salinity is known and is higher than about 20000 parts per million (20 kppm) sodium chloride (NaCl), a different pulsed-neutron technique may be used to measure the rate of capture of thermal neutrons. This quantity, known as the thermal-neutron capture cross-section (Sigma or $\Sigma$), is strongly influenced by the affinity of chlorine (Cl), a primary constituent of saltwater, to absorb thermal neutrons. Conventional pulsed-neutron tools measure $\Sigma$ by measuring the counting rate of gamma ray photons produced by thermal neutron capture after a pulse of neutrons has been released into the formation.

Typical uses of COR measurements are to detect bypassed reserves and monitor them with repeated measurements during the life of the reservoir (time-lapse monitoring). These reservoirs typically have older wells having fresh or unknown salinity environments. For this application, the inherent tool-to-tool accuracy found with conventional downhole tools is typically +/−10 s.u. (expressed in saturation units, s.u., as a percentage by volume of oil in the pore space) in reservoir-like rocks. For the typical applications mentioned above, this accuracy is usually adequate. However, some applications of COR logging such as time-lapse monitoring in very large fields, which may include steam injection, require improved accuracy. These large monitoring projects may require logging 400–500 observation wells every year. Clearly, this necessitates using multiple downhole tools. Also it cannot be guaranteed that the same tool will necessarily log the same well, year after year. Since the COR measurements are used in time-lapse (differential) mode, a technique is needed to calibrate or normalize the readings of the various downhole tools to the database tool. In other words, a method is needed to remove or reduce the +/−10 s.u. tool-to-tool accuracy variations mentioned above.

Typically, there exist some real, quantifiable spectral differences between the downhole tools and the database tool, for otherwise, all tools would read the same and the typical +/−10 s.u. differences would not be observed. This variability in tool-to-tool accuracy may result from buildup of mechanical tolerances, as well as slightly differing properties of scintillation crystals, photomultiplier tubes, shielding, and fast detector electronics and associated regulation loops.

One conventional field technique used in the industry to help improve the accuracy of these measurements involves taking a COR reading in a "known water sand" in a given reservoir. Since the presumed correct COR reading here is zero, any non-zero reading is noted and this single value, the "COR offset," is globally subtracted from the measured COR reading at every depth-level logged. This conventional technique assumes that the COR offset is the same for all formation and borehole conditions - an assumption which, more likely than not, may not be true.

The present invention is directed to overcoming, or at least reducing the effects of, one or more of the problems set forth above.

SUMMARY OF THE INVENTION

In one aspect of the invention, a method of calibrating readings of a downhole tool during well-logging is provided, the method including collecting data representative of gamma ray photon energies detected by a downhole tool during well-logging, a spectrum of the gamma ray photon energies detected by the downhole tool having a derivative with respect to the gamma ray photon energies. The method also comprises calibrating the readings of the downhole tool using at least one predetermined correction factor based on the derivative of the spectrum of the gamma ray photon energies detected by the downhole tool.

In another aspect of the invention, a computer-readable, program storage device is provided, encoded with instructions that, when executed by a computer, perform a method of calibrating readings of a downhole tool, the method including collecting data representative of gamma ray photon energies detected by a downhole tool during well-logging, a spectrum of the gamma ray photon energies detected by the downhole tool having a derivative with respect to the gamma ray photon energies. The method also comprises calibrating the readings of the downhole tool using at least one predetermined correction factor based on the derivative of the spectrum of the gamma ray photon energies detected by the downhole tool.

In yet another aspect of the present invention, a computer programmed to perform a method of calibrating readings of a downhole tool is provided, the method including collecting data representative of gamma ray photon energies detected by a downhole tool during well-logging, a spectrum of the gamma ray photon energies detected by the downhole tool having a derivative with respect to the gamma ray photon energies. The method also comprises calibrating the readings of the downhole tool using at least one predetermined correction factor based on the derivative of the spectrum of the gamma ray photon energies detected by the downhole tool.

BRIEF DESCRIPTION OF THE DRAWINGS

Other aspects and advantages of the invention will become apparent upon reading the following detailed description and upon reference to the drawings in which.

DETAILED DESCRIPTION OF SPECIFIC EMBODIMENTS

In the interest of clarity, not all features of actual implementation are described in this specification. It will be appreciated that although the development of any such actual implementation might be complex and time-consuming, it would nevertheless be a routine undertaking for those of ordinary skill in the art having the benefit of this disclosure.

The data calibration techniques disclosed herein are applicable to gamma ray data obtained with conventional downhole tools, such as those disclosed in the referenced '446 patent. Generally, these types of downhole tools are used for evaluating cased borehole formations to determine the hydrocarbon saturation in the formation, with the capability of providing additional measurements of the fluid phases within the borehole.

In various illustrative embodiments of the invention, very statistically precise formation measurements may be taken with a given downhole tool and a database tool, and the fine spectral differences between these two may be quantified, channel-by-channel. These fine spectral differences may then be transformed into a multi-channel spectral calibration function that may be used to modify the given downhole tool spectrum while logging. This forces the modified spectrum to more nearly match the database tool spectrum, and hence to yield carbon-oxygen ratios more nearly like the database tool. Various illustrative embodiments of this calibration or normalization technique are described below.

The calibration techniques of the invention address the fundamental channel-by-channel fine spectral detail, which, when taken collectively, produces the differences in COR readings. To accurately compare this fine spectral detail between multiple downhole tools, two operations are performed. First, the spectra are correctly energy-aligned, i.e., the spectral peaks from each tool are adjusted to appear in exactly the same energy channels. This is accomplished by determining the so-called spectral "gain" and "offset". Secondly, the spectra are resolution matched (i.e., the resolution of the "better" detector is degraded (worsened) to match the resolution of the "worse" detector).

One way of determining gain, offset, and resolution degradation is by using a non-linear solver that will minimize the statistically-weighted difference in spectral counts between two spectra. For example one such solver might be a Marquardt variety procedure (that adaptively adjusts between a gradient (steepest descent) search and a grid search). This solver method works well when the only differences between the spectra are gain, offset, and resolution degradation. However, this is not always the case. One or more additional components may be present, resulting in additional spectral differences between typical downhole tools and the database tool. As a result, the non-linear solver may not correctly energy-align or resolution match the spectral peaks to the required accuracy.

One solution to these deficiencies is using the shapes of the spectra, rather than the spectra themselves. Shapes are determined by taking the derivative of each spectrum, channel-by-channel, and then gain, offset, and resolution-matching these derivatives using a non-linear solver, for example. Thus, providing an improved energy-aligning and resolution-matching technique.

Next, the derivative-derived gain, offset, and resolution-matching degradation terms are applied back to the measured spectra themselves. This equates the spectra and allows them to be validly compared. Finally, the ratio of the two spectra, the database tool spectrum divided by the other downhole tool spectrum, is taken, channel-by-channel. This results in a multi-channel "spectral calibration function" that effectively provides a gain factor for each of the gamma-ray energy channels or bins. While logging, a given downhole tool spectrum is multiplied by this spectral calibration function, channel-by-channel, at each depth level.

This application of the spectral calibration function thus boosts (increases) the spectrum of the given downhole tool slightly in regions where the spectrum of the given downhole tool reads less than the database tool spectrum. Similarly, this application of the spectral calibration function suppresses (decreases) the spectrum of the given downhole tool slightly in regions where the spectrum of the given downhole tool reads more than the database tool spectrum. This calibration function is fairly immune to differing formation and borehole conditions.

Figure 1:
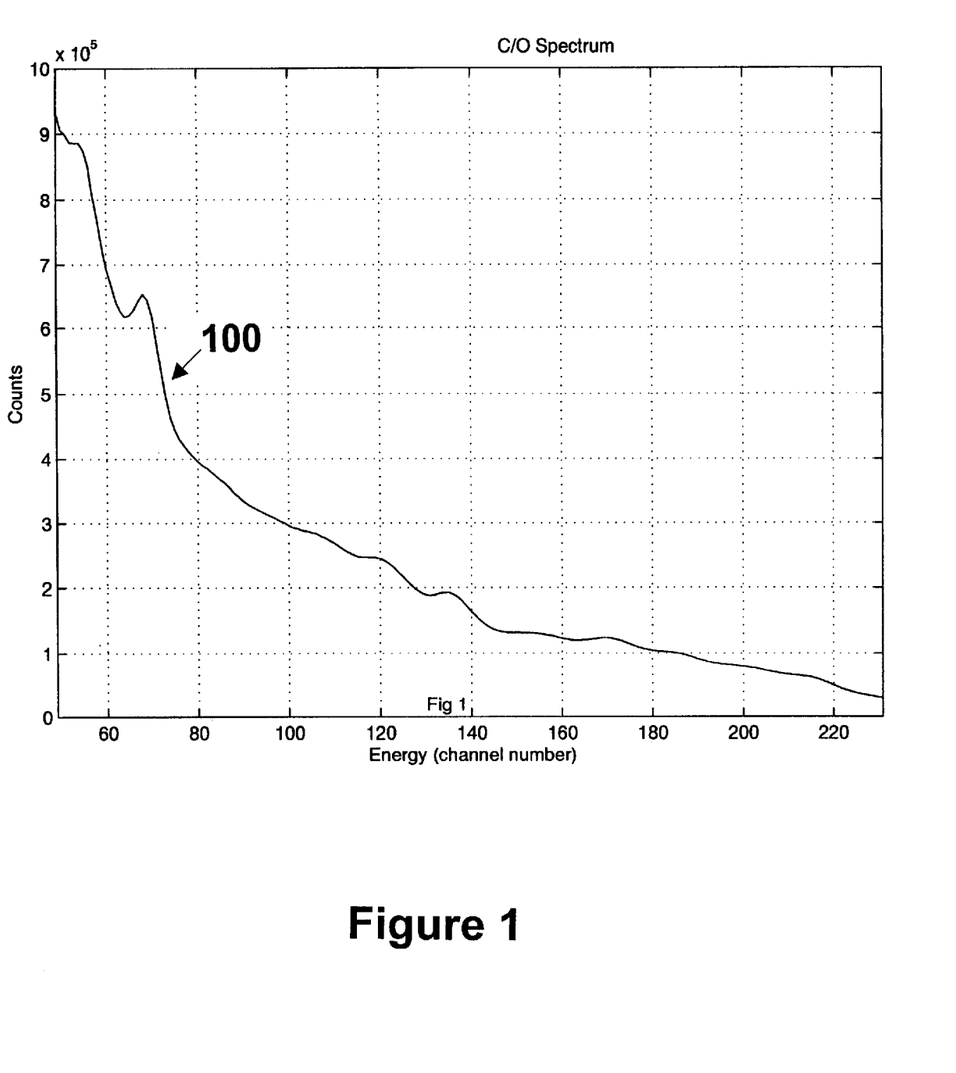
FIG. 1 schematically illustrates an inelastic gamma ray spectrum derived from a downhole tool.

An example of a typical inelastic gamma ray COR downhole tool spectrum 100 is shown in FIG. 1. The gamma ray energies (corresponding to channel numbers) are plotted along the horizontal axis, and the detector counting rates are plotted on a linear scale along the vertical axis.

Figure 2:
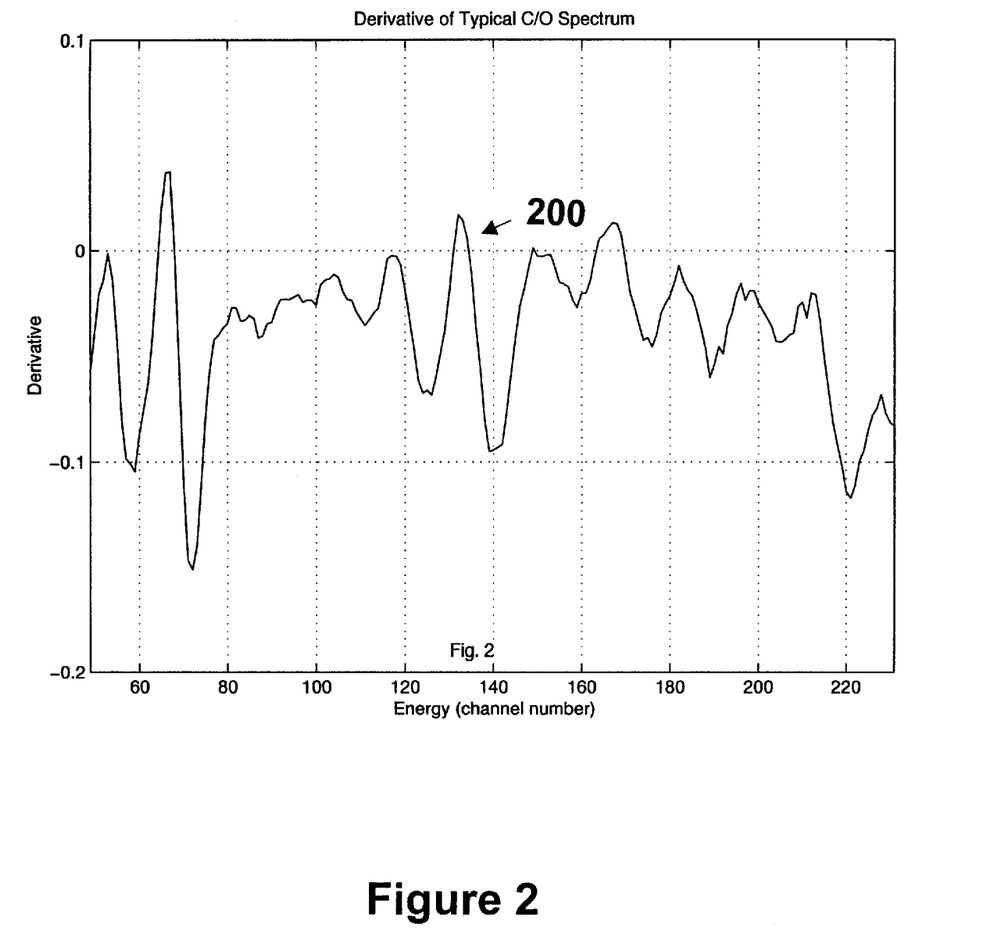
FIG. 2 schematically illustrates a derivative of the inelastic gamma ray spectrum shown in FIG. 1, in accord with the invention.

The corresponding derivative function is shown in FIG. 2. The derivative contains much more structure than the parent spectrum, and thus lends itself much better to gain, offset, and resolution matching than does the parent spectrum. For example, higher energy peaks barely visible in the count-rate spectrum (FIG. 1) show very clearly in the derivative function.

An embodiment of the calibration method in accord with the invention was verified in the laboratory as follows. Seven downhole tools used in a large North American monitoring project, as well as the database tool, were carefully benchmarked in several different formation/borehole environments. Oil and water-sand formations, of high porosity [about 33 p.u., in porosity units, the percentage by volume of the formation that is filled with fluids such as air, gas or liquid] and having a 10 in. (25.4 cm) borehole, were completed with a 7 in. (17.78 cm) 23 lbm/ft cemented steel casing having alternately fresh water and oil in the borehole. Open hole completion oil- and water-lime formations, of medium porosity (about 18 p.u.) with a 6-in. (15.24 cm) borehole having alternately fresh water and oil in the borehole, were also used. These formations and completions match commonly encountered environments for COR logging with conventional downhole tools. Two-hour accumulations were taken in these eight different formation/borehole conditions to precisely determine the fine spectral differences between each of the seven downhole tools and those of the database tool. The above-described calibration method was applied to generate calibration functions in each of the eight formations for each of the seven tools.

Figure 3:
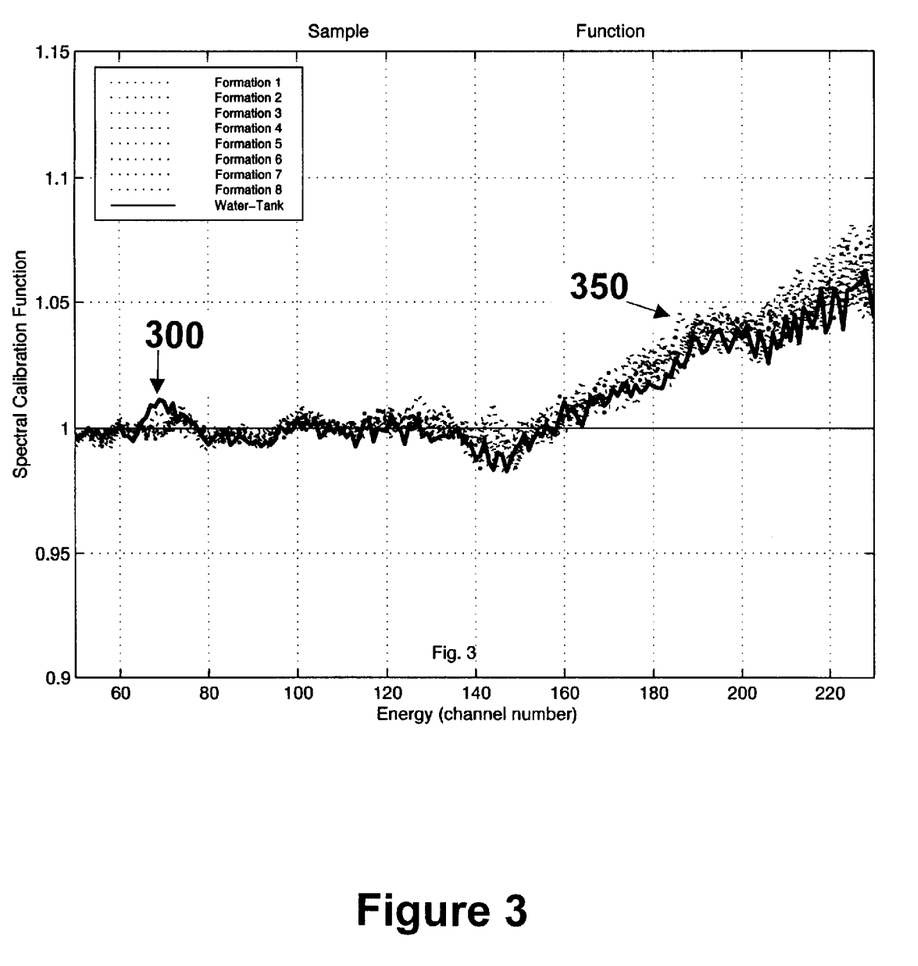
FIG. 3 schematically illustrates spectral calibration functions (dotted curves) derived in eight formations for a detector of a downhole tool along with the spectral calibration function derived in a water tank (heavy solid line).

The results showed that it was not necessary to have true rock-type formations to develop an effective calibration. It was further determined that using a commonly available water tank, with a polyethylene sleeve insert for the borehole, resulted in a good match to the calibration functions obtained in real rock-type formations. Such equipment routinely exists at field locations and construction of rock-type formations around the world may be logistically prohibitive. An example of the spectral calibration functions derived in the eight formations for the detector of one particular downhole tool is shown in FIG. 3 (dotted curves 350) along with the spectral calibration function derived in the water-tank (heavy solid line 300).

Using the water-tank derived tool calibration function, the average COR tool-to-tool accuracy variation for all seven field tools in the eight formations was reduced from +/−10 s.u. to only 1.5 s.u. for both the spectrally fitted method and the windows method. The 1.5 s.u. error is just about the same as the (Poisson statistics) standard deviation for a two-hour formation measurement. Thus, within statistical precision, all seven field tools, on average, read the same as the database tool.

Although various illustrative embodiments of methods in accord with the present invention have been described as used in carbon-oxygen logging, methods in accord with the present invention are not limited to this application. Alternative embodiments of techniques in accord with the invention may also be implemented in non-nuclear applications, whenever and wherever "X-axis registration" and "shape matching" are relevant and germane.

Figure 4:
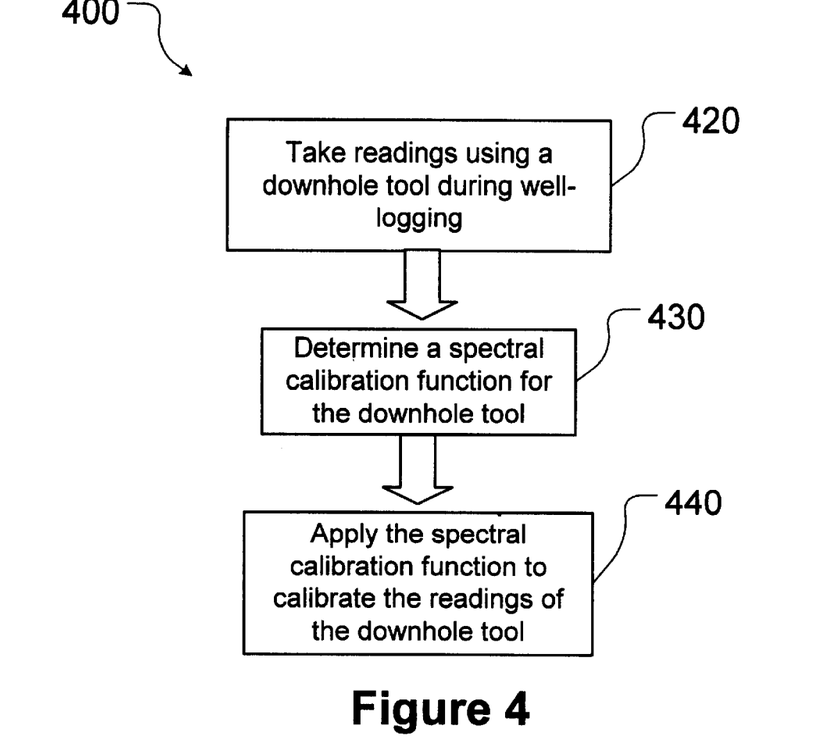
FIG. 4 schematically illustrates a method of calibrating readings of a downhole tool in accord with the invention.
Figure 5:
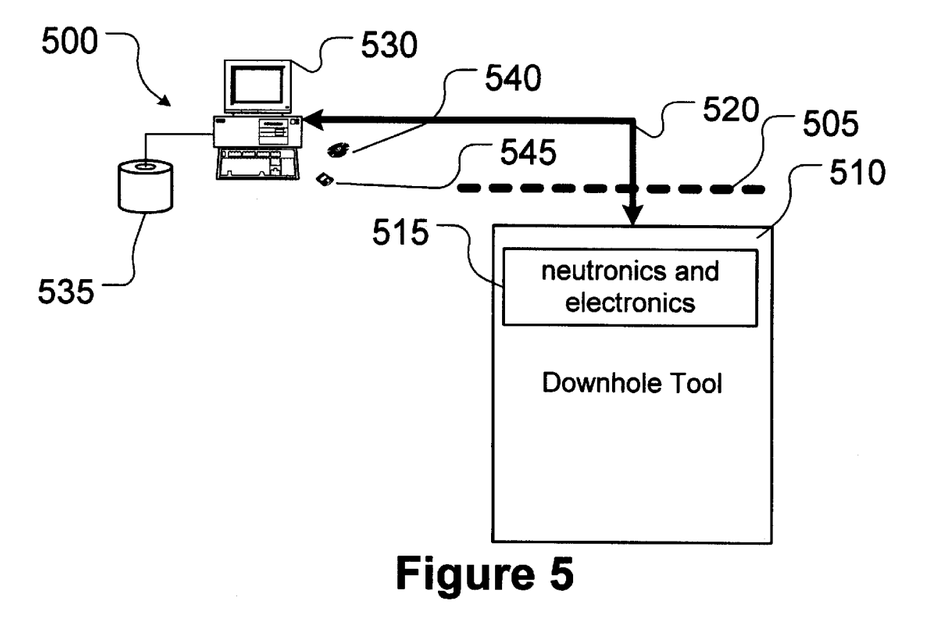
FIG. 5 schematically illustrates a well-logging system using a method of calibrating readings of a downhole tool in accord with the invention.

FIG. 4 illustrates one particular embodiment of a method 400 practiced in accordance with the invention. FIG. 5 illustrates one particular apparatus 500 with which the method 400 may be practiced. For the sake of clarity, and to further an understanding of the invention, the method 400 shall be disclosed in the context of the apparatus 500. However, the invention is not so limited and admits wide variation, as is discussed further herein.

Referring now to both FIGS. 4 and 5, a downhole tool 510, such as those disclosed in the referenced '446 patent, is used during well-logging in a borehole (not shown) below a surface 505. The downhole tool 510 has, among other things, a set of neutronics and electronics 515 that may include a fast neutron generator (not shown), at least one gamma ray photon detector (not shown), a controller (not shown) and a communications capability (not shown). The fast neutron generator in the set of neutronics and electronics 515 generates fast neutrons (having kinetic energies of about 14 MeV) during well-logging that scatter inelastically off of atomic nuclei in the materials surrounding the downhole tool 510. Inelastic gamma ray photons generated by inelastic collisions of the fast neutrons with the atomic nuclei in the materials surrounding the downhole tool 510 may be detected in the one or more gamma ray photon detectors in the set of neutronics and electronics 515.

The controller in the set of neutronics and electronics 515 controls the fast neutron generator and the one or more gamma ray photon detectors. The communicator in the set of neutronics and electronics 515 communicates via a line 520 (such as a two-way data link) with a computer system 530. The communicator in the set of neutronics and electronics 515 may receive instructions from the computer system 530. The communicator in the set of neutronics and electronics 515 may also send to the computer system 530 collected data representative of gamma ray photon energies detected in the one or more gamma ray photon detectors in the set of neutronics and electronics 515 during the well-logging.

The method 400 of FIG. 4 begins, as set forth in box 420, by taking readings using a downhole tool 510 during well-logging. The taking of readings may include using the set of neutronics and electronics 515 to generate fast neutrons during the well-logging and to collect data representative of the inelastic gamma ray photon energies detected by the downhole tool 510 during the well-logging. A spectrum of the inelastic gamma ray photon energies detected by the downhole tool 510 during the well-logging may resemble the inelastic gamma ray spectrum 100, as shown in FIG. 1.

The method 400 of FIG. 4 proceeds, as set forth in box 430, by determining a spectral calibration function for the downhole tool 510. For example, the spectral calibration function may be determined as described above and/or by any of the following methods.

In various illustrative embodiments of the invention, the spectral calibration function may be determined by comparing at least a portion of a derivative of the spectrum of the gamma ray photon energies detected by the downhole tool with a store of previous derivatives of spectra of gamma ray photon energies detected by a database tool. The derivative of the spectrum of the inelastic gamma ray photon energies detected by the downhole tool 510 during the well-logging may resemble the derivative of the inelastic gamma ray spectrum 200, as shown in FIG. 2.

In various of these illustrative embodiments of the invention, the spectral calibration function may be determined by comparing a substantial portion of the derivative of the spectrum of the gamma ray photon energies detected by the downhole tool with the store of previous derivatives of spectra of gamma ray photon energies detected by a database tool. In various others of these illustrative embodiments of the present invention, the spectral calibration function may be determined by comparing substantially all of the derivative of the spectrum of the gamma ray photon energies detected by the downhole tool with the store of previous derivatives of spectra of gamma ray photon energies detected by a database tool.

The method 400 of FIG. 4 proceeds, as set forth in box 440, by applying the spectral calibration function to calibrate the readings of the downhole tool 510, using at least one predetermined correction factor. The at least one predetermined correction factor may be predetermined as described above. Calibrating the readings of the downhole tool 510 may include choosing the at least one predetermined correction factor based on the spectral calibration function for the downhole tool 510 as described above. Calibrating the readings of the downhole tool 510 may also include choosing the at least one predetermined correction factor based on the position of the detector(s) on the downhole tool that is used, whether sandstone (largely silicon dioxide-containing) or limestone (largely calcium carbonate-containing) lithology formations are present, and whether open-hole or cased-hole completions are used.

In various illustrative embodiments, calibrating the readings of the downhole tool 510 using the at least one predetermined correction factor based on the derivative of the spectrum 200 of the gamma ray photon energies detected by the downhole tool 510 may include taking the derivative of the spectrum of the gamma ray photon energies detected by the downhole tool at each of a plurality of gamma-ray photon energy channels, channel-by-channel. In various of these illustrative embodiments, the derivative of the spectrum 200 of the gamma ray photon energies detected by the downhole tool may be gain, offset, and resolution-matched with a derivative of a spectrum (not shown) of gamma ray photon energies detected by a database tool (not shown) to obtain derivative-derived gain, offset and resolution degradation terms.

A spectral calibration function may then be determined, expressed in the form of a formula, a look-up table, a relational database, and the like, summarizing the derivative-derived gain, offset and resolution degradation terms so obtained. In various of these illustrative embodiments, for example, the derivative-derived gain, offset and resolution degradation terms so obtained may be applied to the collected data representative of the gamma ray photon energies detected by the downhole tool 510 during the well-logging, yielding a spectral calibration function for the downhole tool 510 to correct the spectrum 100 of the gamma ray photon energies detected by the downhole tool 510 at each of the plurality of gamma-ray photon energy channels, channel-by-channel.

Various illustrative embodiments of a method according to the present invention also may lend themselves to calibration and/or compensation of readings taken during other types of well-logging besides carbon-oxygen well-logging, such as inelastic gamma-ray spectroscopy well-logging, capture gamma-ray spectroscopy well-logging, natural gamma-ray spectroscopy well-logging, activation gamma-ray spectroscopy well-logging, and the like.

The computer system 530 in FIG. 5 may be programmed to execute any of the above-described embodiments of a method according to the invention. The manner in which this programming and execution occurs is generally implementation specific.

In the embodiment of FIG. 5, a database 535 may store a plurality of correction factors that might potentially be applied, depending upon which spectral calibration functions are determined. This particular embodiment, therefore, requires some a priori knowledge of the spectral calibration functions that might be determined. The computer system 530 then extracts an appropriate correction factor(s) from the database 535 of correction factors to apply to the measured uncorrected spectral reading(s). If the database 535 does not include an appropriate correction factor(s), then the measured uncorrected spectral reading(s) may be ignored, or the computer system 530 may attempt to develop one, if so programmed. The database 535 may be stored on any kind of computer-readable, program storage medium, such as an optical disk 540, a floppy disk 545, or a hard disk drive (not shown) of the computer system 530. The database 535 may also be stored on a separate computer system (not shown) that interfaces with the computer system 530.

Calibrating the measured uncorrected spectral reading(s) may be implemented differently in alternative embodiments. For instance, the computer system 530 may be programmed using some form of artificial intelligence to analyze the sensor outputs and controller inputs of the downhole tool 510 to develop an appropriate correction factor(s) on-the-fly in a real-time implementation. This approach might be a useful adjunct to various of the embodiments illustrated in FIG. 5, and discussed above, where there are measured uncorrected spectral reading(s) for which the database 535 has no appropriate correction factor(s).

Some alternative embodiments may employ a form of feedback to improve the calibration of measured uncorrected spectral reading(s). The implementation of this feedback is dependent on several disparate facts, including the sensing capabilities of the well-logging tool 510 and economics. One technique for doing this would be to monitor at least one effect of the implementation of the calibration of measured uncorrected spectral reading(s), and update the correction of measured uncorrected spectral reading(s) based on the effect(s) monitored. The update may also depend on the correction of measured uncorrected spectral reading(s). For instance, a linear calibration of measured uncorrected spectral reading(s) may require a different update than would a non-linear calibration of measured uncorrected spectral reading(s), all other factors being the same.

As is evident from the discussion above, some features of the present invention are implemented in software. For instance, the acts set forth in the boxes 420–440 in FIG. 4 are, in the illustrated embodiment, software-implemented, in whole or in part. Thus, some features of the present invention are implemented as instructions encoded on a computer-readable, program storage medium. The program storage medium may be of any type suitable to the particular implementation. However, the program storage medium will typically be magnetic, such as the floppy disk 545 or the computer 530 hard disk drive (not shown), or optical, such as the optical disk 540. When these instructions are executed by a computer, they perform the disclosed functions. The computer may be a desktop computer, such as the computer 530. However, the computer might alternatively be a processor embedded in the well-logging tool 510. The computer might also be a laptop, a workstation, or a mainframe in various other embodiments. The scope of the invention is not limited by the type or nature of the program storage medium or computer with which embodiments of the invention might be implemented.

Thus, some portions of the detailed descriptions herein are, or may be, presented in terms of algorithms, functions, techniques, and/or processes. These terms enable those skilled in the art most effectively to convey the substance of their work to others skilled in the art. These terms are here, and are generally, conceived to be a self-consistent sequence of steps leading to a desired result. The steps are those requiring physical manipulations of physical quantities. Usually, though not necessarily, these quantities take the form of electromagnetic signals capable of being stored, transferred, combined, compared, and otherwise manipulated.

It has proven convenient at times, principally for reasons of common usage, to refer to these signals as bits, values, elements, symbols, characters, terms, numbers, and the like. All of these and similar terms are to be associated with the appropriate physical quantities and are merely convenient labels applied to these quantities and actions. Unless specifically stated otherwise, or as may be apparent from the discussion, terms such as "processing," "computing," "calculating," "determining," "displaying," and the like, used herein refer to the action(s) and processes of a computer system, or similar electronic and/or mechanical computing device, that manipulates and transforms data, represented as physical (electromagnetic) quantities within the computer system's registers and/or memories, into other data similarly represented as physical quantities within the computer system's memories and/or registers and/or other such information storage, transmission and/or display devices.

As described above, some applications of COR logging such as time-lapse monitoring in very large fields, which may include steam injection, demand improved absolute accuracy. These large monitoring projects may require logging 400–500 observation wells every year. Clearly, this necessitates using multiple downhole tools and it cannot be guaranteed that the same tool will necessarily log the same well, year after year. Any of the above-disclosed embodiments of a method of calibrating readings of a downhole tool according to the invention enables normalization of the readings of the various downhole tools to the database tool used to characterize the downhole tool response. In other words, any of the above-disclosed embodiments of a method of calibrating readings of a downhole tool according to the invention enables the removal of tool-to-tool accuracy variations.

While the methods of the invention have been described as specific embodiments, it will be apparent to those skilled in the art that variations may be applied to the structures and in the steps or in the sequence of steps of the methods described herein without departing from the concept and scope of the invention. All such similar variations apparent to those skilled in the art are deemed to be within this concept and scope of the invention as defined by the appended claims.

What is claimed:

1. A method of calibrating readings of a downhole tool, the method comprising:
   collecting data representative of gamma ray photon energies detected by the downhole tool during well-logging, a spectrum of the gamma ray photon energies detected by the downhole tool having a derivative with respect to the gamma ray photon energies; and
   calibrating the readings of the downhole tool using at least one predetermined correction factor based on the derivative of the spectrum of the gamma ray photon energies detected by the downhole tool.

2. The method of claim 1, wherein calibrating the readings of the downhole tool comprises choosing the at least one predetermined correction factor based on a spectral calibration function for the downhole tool.

3. The method of claim 1, wherein calibrating the readings of the downhole tool using the at least one predetermined correction factor based on the derivative of the spectrum of the gamma ray photon energies detected by the downhole tool comprises taking the derivative of the spectrum of the gamma ray photon energies detected by the downhole tool at each of a plurality of gamma-ray photon energy channels, channel-by-channel.

4. The method of claim 3, wherein the derivative of the spectrum of the gamma ray photon energies detected by the downhole tool is gain, offset, and resolution-matched with a derivative of a spectrum of gamma ray photon energies detected by a database downhole tool to obtain derivative-derived gain, offset and resolution degradation terms.

5. The method of claim 4, wherein the derivative-derived gain, offset and resolution degradation terms are applied to the collected data representative of the gamma ray photon energies detected by the downhole tool during the well-logging, yielding a spectral calibration function for the downhole tool to correct the spectrum of the gamma ray photon energies detected by the downhole tool at each of the plurality of gamma-ray photon energy channels, channel-by-channel.

6. The method of claim 1, wherein the downhole tool includes multiple gamma ray photon detectors.

7. A method of calibrating readings of a downhole tool, the method comprising:
   generating fast neutrons using the downhole tool during well-logging, the downhole tool having first and second gamma ray photon detectors;
   collecting data representative of inelastic gamma ray photon energies detected by the first and second gamma ray photon detectors of the downhole tool during the well-logging, a spectrum of the inelastic gamma ray photon energies detected by the first and second gamma ray photon detectors of the downhole tool having a derivative with respect to the gamma ray photon energies; and
   calibrating the readings using at least one predetermined first correction factor for the first gamma ray photon detector and at least one predetermined second correction factor for the second gamma ray photon detector based on the derivative of the spectrum of the gamma ray photon energies detected by the downhole tool.

8. The method of claim 7, wherein calibrating the readings comprises choosing the at least one predetermined first correction factor and the at least one predetermined second correction factor based on a spectral calibration function for the downhole tool.

9. The method of claim 7, calibrating the readings using the at least one predetermined first correction factor for the first gamma ray photon detector and the at least one predetermined second correction factor for the second gamma ray photon detector based on the derivative of the spectrum of the gamma ray photon energies detected by the downhole tool comprises taking the derivative of the spectrum of the gamma ray photon energies detected by the downhole tool at each of a plurality of gamma-ray photon energy channels, channel-by-channel.

10. The method of claim 9, wherein the derivative of the spectrum of the gamma ray photon energies detected by the downhole tool is gain, offset, and resolution-matched with a derivative of a spectrum of gamma ray photon energies detected by a database downhole tool to obtain derivative-derived gain, offset and resolution degradation terms.

11. The method of claim 10, wherein the derivative of the spectrum of the gamma ray photon energies detected by the downhole tool is gain, offset, and resolution-matched with a derivative of a spectrum of gamma ray photon energies detected by a database downhole tool to obtain derivative-derived gain, offset and resolution degradation terms.

12. A computer-readable, program storage device, encoded with instructions that, when executed by a computer, perform a method comprising:

collecting data representative of gamma ray photon energies detected by a downhole tool during well-logging, a spectrum of the gamma ray photon energies detected by the downhole tool having a derivative with respect to the gamma ray photon energies; and calibrating readings of the downhole tool using at least one predetermined correction factor based on the derivative of the spectrum of the gamma ray photon energies detected by the downhole tool.

13. The computer-readable, program storage device of claim 12, wherein calibrating the readings of the downhole tool comprises choosing the at least one predetermined correction factor based on a spectral calibration function for the downhole tool.

14. The computer-readable, program storage device of claim 12, wherein calibrating the readings of the downhole tool using the at least one predetermined correction factor based on the derivative of the spectrum of the gamma ray photon energies detected by the downhole tool comprises taking the derivative of the spectrum of the gamma ray photon energies detected by the downhole tool at each of a plurality of gamma-ray photon energy channels, channel-by-channel.

15. The computer-readable, program storage device of claim 14, wherein the derivative of the spectrum of the gamma ray photon energies detected by the downhole tool is gain, offset, and resolution-matched with a derivative of a spectrum of gamma ray photon energies detected by a database downhole tool to obtain derivative-derived gain, offset and resolution degradation terms.

16. The computer-readable, program storage device of claim 15, wherein the derivative-derived gain, offset and resolution degradation terms are applied to the collected data representative of the gamma ray photon energies detected by the downhole tool during the well-logging, yielding a spectral calibration function for the downhole tool to correct the spectrum of the gamma ray photon energies detected by the downhole tool at each of the plurality of gamma-ray photon energy channels, channel-by-channel.

17. A computer programmed to perform a method comprising:

collecting data representative of gamma ray photon energies detected by a downhole tool during well-logging, a spectrum of the gamma ray photon energies detected by the downhole tool having a derivative with respect to the gamma ray photon energies; and calibrating readings of the downhole tool using at least one predetermined correction factor based on the derivative of the spectrum of the gamma ray photon energies detected by the downhole tool.

18. The computer of claim 17, wherein calibrating the readings of the downhole tool comprises choosing the at least one predetermined correction factor based on a spectral calibration function for the downhole tool.

19. The computer of claim 17, wherein calibrating the readings of the downhole tool using the at least one predetermined correction factor based on the derivative of the spectrum of the gamma ray photon energies detected by the downhole tool comprises taking the derivative of the spectrum of the gamma ray photon energies detected by the downhole tool at each of a plurality of gamma-ray photon energy channels, channel-by-channel.

20. The computer of claim 19, wherein the derivative of the spectrum of the gamma ray photon energies detected by the downhole tool is gain, offset, and resolution-matched with a derivative of a spectrum of gamma ray photon energies detected by a database downhole tool to obtain derivative-derived gain, offset and resolution degradation terms.

21. The computer of claim 20, wherein the derivative-derived gain, offset and resolution degradation terms are applied to the collected data representative of the gamma ray photon energies detected by the downhole tool during the well-logging, yielding a spectral calibration function for the downhole tool to correct the spectrum of the gamma ray photon energies detected by the downhole tool at each of the plurality of gamma-ray photon energy channels, channel-by-channel.

* * * * *